Aug. 25, 1936.    S. C. HAYWARD    2,051,851
MULTISCALE INDICATOR
Filed Aug. 19, 1935    2 Sheets-Sheet 1

Witnesses
Rodwick Malcolm
George C. Jepson

INVENTOR
Sheldon C. Hayward
BY J. R. Goldsborough
ATTORNEY

Aug. 25, 1936.　　　　S. C. HAYWARD　　　　2,051,851
MULTISCALE INDICATOR
Filed Aug. 19, 1935　　　　2 Sheets-Sheet 2
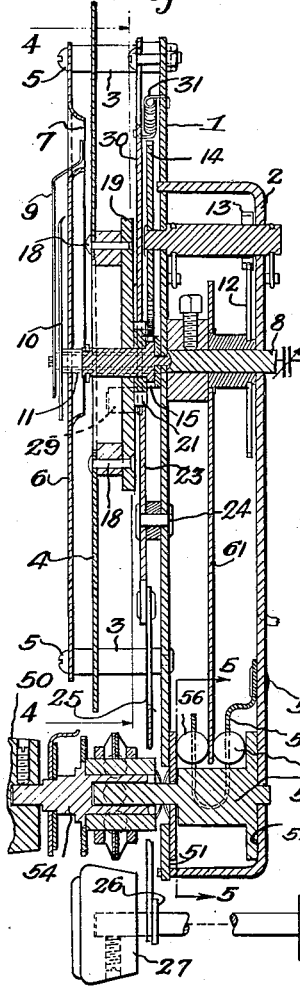
Fig. 2
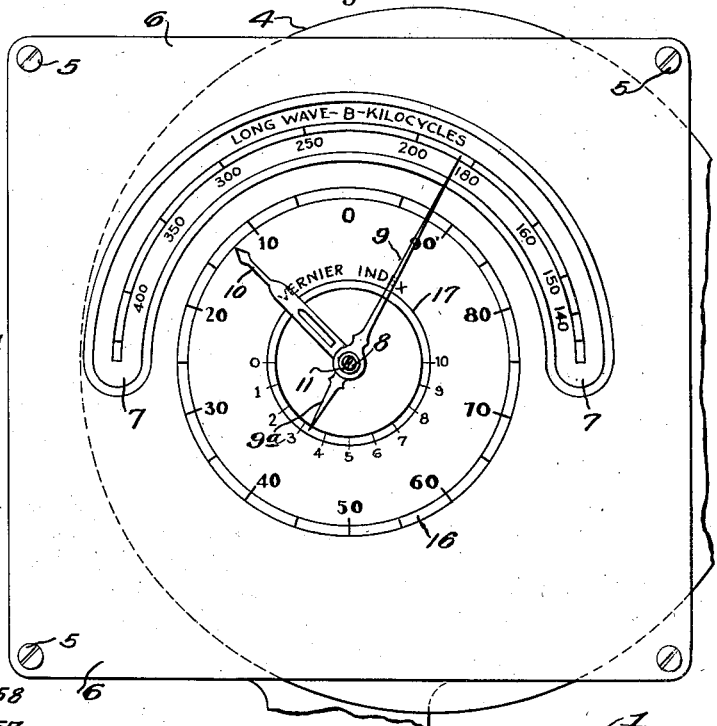
Fig. 3
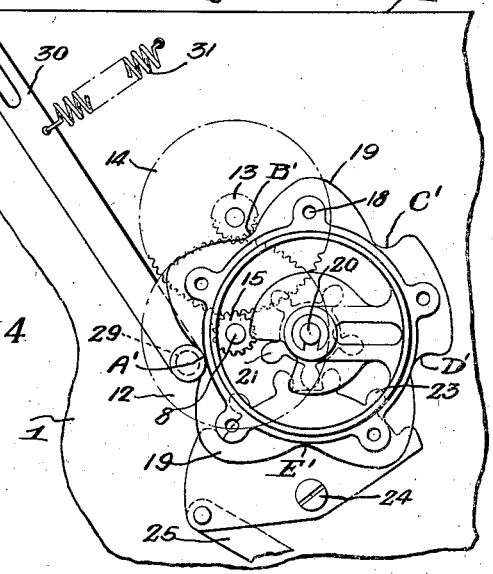
Fig. 5
Fig. 4
Witnesses
Roderick Malcolm
George E. Jepson
INVENTOR
Sheldon C. Hayward.
BY T. R. Goldsborough
ATTORNEY Patented Aug. 25, 1936

2,051,851

UNITED STATES PATENT OFFICE 2,051,851

MULTISCALE INDICATOR

Sheldon C. Hayward, Merchantville, N. J., assignor to Radio Corporation of America, a corporation of Delaware Application August 19, 1935, Serial No. 36,901

19 Claims. (Cl. 116—124.1)

This invention relates to multi-scale indicators, particularly to tuning indicators for so-called "all-wave" radio apparatus, and has special reference to the provision of a radio dial adapted to accommodate a multiplicity of frequency band scales and to means for rendering said scales selectively visible. While the invention will be described in connection with radio receiving apparatus it is to be understood that the invention is not limited to such application as the disclosure is in this respect merely illustrative for purposes of explaining the inventive concept.

Modern practice dictates the construction of radio receiving sets capable of translating not only the standard broadcast frequency range but also ultra-high, intermediate and low frequency ranges, usually five bands in all. It is desirable, in order to avoid confusion, that but one band scale, indicative of the particular frequency range in use, be visible at a given moment. To this end it has previously been proposed that the several scales be printed or otherwise marked upon a rotatable drum or upon a movable curtain and the drum revolved or the curtain shifted, as the case may be, to present the different scales to view as the inductance and/or capacity of the circuit is changed in discrete steps by means of a multi-position switch.

Regardless of the advantages claimed for drum type and curtain type dials, it may be said generally that they are cumbersome and present complex gearing and alignment problems. Further, if, as is usually the case in multi-range receivers, a number of controls must be provided in a limited panel area the drum or curtain, and hence the scales, must be smaller and the scale markings more crowded than is desirable. Since, up to now, it has not been practical to accommodate a multiplicity of selectively visible semicircular scales upon a single dial, the prior art dictates the use of less satisfactory types, such as linear and short-arc scales.

An object, therefore, of the invention is to provide a dial accommodating a desired maximum number of scales in a minimum dial area, each of the scales being of a contour ensuring maximum band spread and visibility.

Another object of the invention is to provide a multi-scale tuning indicator wherein the pointer or index is coupled directly to the tuner, and wherein both the dial and pointer are pivoted for simple rotary movement.

The invention contemplates and its construction provides a rotatable surface having a plurality of scales so arranged thereon that corresponding points, e. g. the mid-points, of the several scales are equally distant from an axis of the surface, but the opposite ends, on any given scale, are unequally distant from the said axis.

The scales are preferably, but not necessarily, of substantially semi-circular contour and when positioned in accordance with the principle of the invention each may be said to be eccentrically arranged on the dial surface and symmetrically arranged in a group around a common axis of the said surface.

A main direct reading pointer and a vernier pointer are provided. The main pointer is preferably pivoted on the main tuning shaft of a tuning means, such as a gang condenser, and the vernier pointer on a sleeve on this shaft. The axis of the dial surface upon which the several scales are marked is offset a suitable distance from the shaft carrying these pointers so that when the dial is revolved on its axis the respective radial centers about which the several scales are circumscribed will coincide or register with the axis of the pointer-carrying shaft.

Certain details of construction together with other objects and advantages will be apparent and the invention itself will be best understood by reference to the following specification and to the accompanying drawings, wherein:

Figure 2 is a vertical section taken on the line 2—2 of Figure 1;

Figure 3 is a front elevation of the device of Figure 1 with the escutcheon or dial frame in position;

Figure 4 is a sectional elevation taken on the line 4—4 of Figure 2;

Figure 5 is a fragmentry sectional view, the section being taken on the line 5—5 in Figure 2, of a part of the dial driving mechanism;

Figure 1:
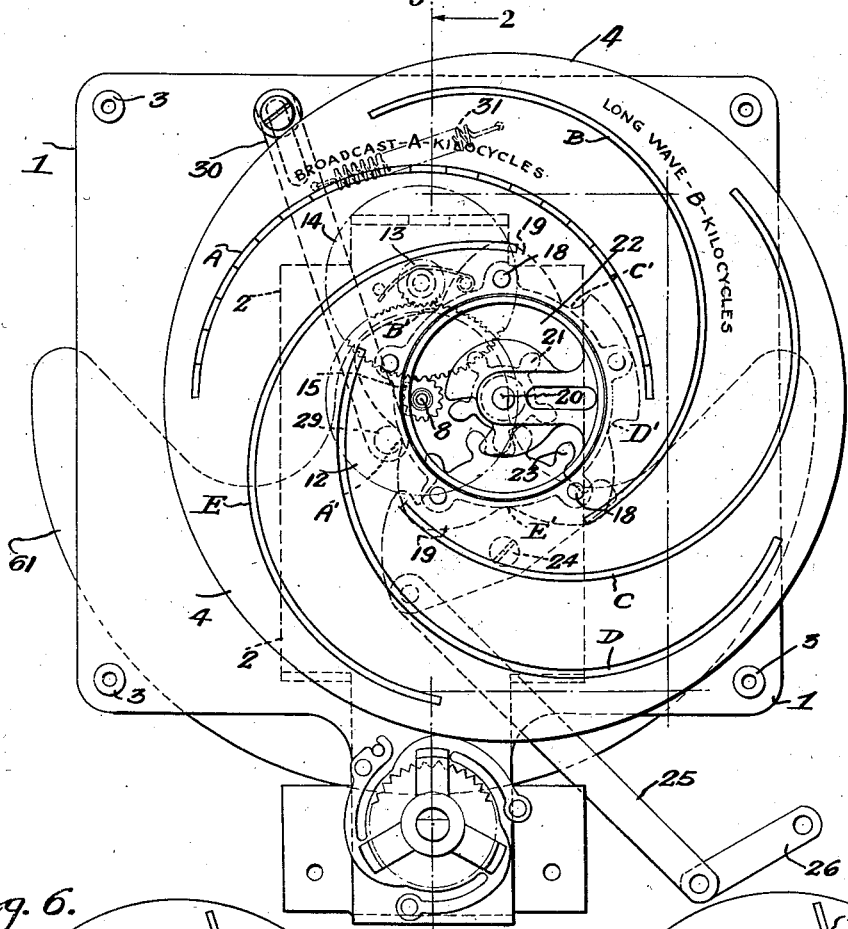
Figure 1 is a front elevation of an indicator within the present invention showing a plurality of indicator scales eccentrically marked upon a single rotary disc, each of the scales being in the form of a semi-circle; the frame in which the scales are selectively viewed has been removed to show an appropriate mechanism for operating the device.

In Figures 1 to 5, inclusive, I designates a back mounting plate, which may be conveniently supported by a frame 2 extending outwardly from the chassis or base of the receiving apparatus.

Spaced therefrom as by spacers 3 to accommodate the dial 4 and dial actuating apparatus, and secured to the frame as by screws 5 is a front panel or escutcheon 6 having a suitable aperture or frame 7 through which the respective dial scales, in this case five in number, A, B, C, D and E, may be viewed. The mounting plate 1 and escutcheon 6 are suitably orificed to accommodate an extension of the main tuning shaft 8. A main scale pointer 9 and an auxiliary of vernier scale pointer 10 are mounted upon the terminal section of the shaft 8, pointer 9 being fixed directly to the shaft 8 and pointer 10 to a sleeve 11 driven by a gear reduction mechanism 12, 13, 14, 15. As shown in Figure 3, the escutcheon 6 is provided with a suitable vernier scale 16 about which the vernier pointer 10 is adapted to travel and a vernier index 17. The index serves, in conjunction with the tail 9a of the main scale pointer 9, to indicate the number of revolutions made by the vernier pointer to attain a desired scale reading. It will be noted that in the illustrated embodiment the aperture or frame 7 for the main dial 4 is in the form of a semicircle, symmetrically disposed about the vernier scale 16, enabling the operator to view both scales simultaneously.

Referring to Figure 1, the dial 4 upon which the several frequency band scales A, B, C, D and E are marked, is preferably in the form of a circular disc. The disc or dial 4 is securely fixed preferably about its center as by rivets 18 or other means to hub 19 which is disposed for rotation upon an axle 20 offset from the pointer-carrying tuning shaft 8. Axle 20 may conveniently be secured to the mounting plate 1 and extend outwardly therefrom.

The dial face is marked or carries a plurality of separate scales A, B, C, D and E corresponding in number to the frequency ranges or bands through which the radio apparatus is adapted to be tuned, in this embodiment, five. These scales are preferably of substantially arcuate contour and may, as shown, extend 180 degrees; they are eccentrically disposed about the dial to ensure proper registration of the scales with the escutcheon aperture 7. Accurate registration is ensured when the radial centers about which the separate scales are circumscribed fall upon the circumference of a circle whose radius is equal to the distance from the tuning shaft 8 to the dial axle 20.

The hub 19 upon which the main dial 4 is mounted may conveniently be molded or otherwise formed from a single piece of metal; it comprises a five-pointed pinion 21 surrounding the axis 20 and a cut-away portion 22 providing clearance for the terminal section of the pointer-carrying tuning shaft 8.

A driving gear sector 23, pivoted as at 24, cooperates with pinion 21 to rotate the dial hub; torque is applied thereto through levers 25 and 26 which, as shown in Figures 1 and 2, are actuated by turning the knob 27 of a wave change switch 28. The hub 19 has a number of rounded star-shaped cam surfaces formed about its outer periphery. The peripheral sections of small radii constitute a series of detents A', B', C', D' and E', (one for each main dial scale) in which a cam follower roller 29 is adapted to rest. The cam follower 29 is mounted upon a freely pivoted arm 30 and serves not only to "lock" the dial hub 19 in a desired position but to move it into such position by rolling pressure exerted through arm 30 by spring 31 if, inadvertently, the torque applied to hub 19 through gear 21 is more or less than that required to bring a selected scale in register with the escutcheon aperture.

Any suitable or convenient reduction gear device may be provided intermediate the tuning knob 50 and main tuning shaft 8. The mechanism shown in cross section in Figure 2 is similar to that described in copending application Serial No. 713,260 to Donald R. De Tar, assigned to the same assignee as the instant case. As shown in Figure 2, frame 2 is bent over to form a U shaped member, the left side wall of which is designated 51 and the right side wall, formed by the back of mounting plate 2, 52. A spool 53 is fixed on a shaft 54 which is journaled in these spaced parallel walls 51 and 52.

Complementary rotor elements, in the form of balls 55 and 56, are supported between the ends of the spool 53 and on the same side of the axis of rotation of the latter in line, parallel to the axis.

The supporting means for the balls 55—56 is in the form of a U-shape retainer member 57 fixed to the frame 2 by rivets 58 and provided in the U with circular holes 59 (Figure 5) in which the balls 55—56 have a free running fit. As shown in Figure 5, the bottom of the member 57 is cut away at 60 to accommodate the spool 53.

In applying the De Tar device to the set, the edge of a disc 61, fixed on the main tuning shaft 8, is inserted between the balls 55—56. The distance between the spool ends is made slightly less than twice the diameter of one of the balls 55—56 plus the thickness of the disc 61 so that insertion of the edge of the disc 61 between the balls 55—56 may be forced, whereupon the spool ends are flexed slightly outwardly. With the parts assembled, therefore, the balls 55—56 are held in frictional driving engagement with the opposite faces of the disc 61 and the frictional driving surfaces of the spool ends by the spring action of the latter.

A desired band having been selected by means of the knob 27 on wave change switch 28, and with the corresponding dial scale thrown into position by the previously described lever and gear arrangement, interstation tuning is accomplished by rotating the shaft 54 by means of the knob 50, fixed thereon. Due to the frictional driving engagement between the inner faces of the spool ends and the balls 55—56 the latter are then caused to rotate about fixed axes each perpendicular to the axis of rotation of the spool, the free running fit of the balls in the retainer 57 permitting this. The main tuning shaft 8 is then caused to rotate by reason of the frictional driving engagement between the balls and the respective opposite faces of the disc 61. The relation between the angle through which the condenser plates (not shown) is rotated and the angle through which the shaft 54 is rotated is equal to the relation between the distance from the axis of shaft 54 to the point of contact of the balls 55—56 with the disc 61, and the distance from this point to the axis of shaft 8. From this it will be seen that a substantial reduction is obtained, so that very fine adjustments of the tuning devices can be made by turning the knob 50 through a small angle. As represented in the drawings, there is a reduction of about ten to one between the shafts 54 and 8.

Figure 6:
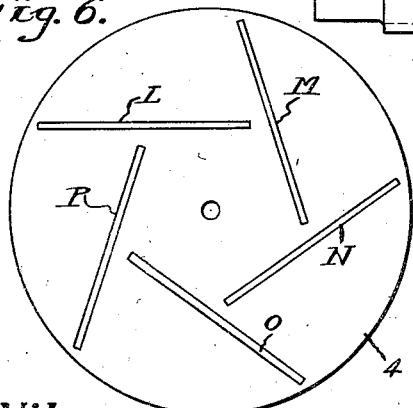
Figure 6 is a front elevation of a dial having a multiplicity of linear scales arranged thereon in accordance with the invention.

Although maximum visibility is ensured when the scales are in the form of semi-circles it is not always necessary that they extend 180°, nor indeed that they be of arcuate contour. As clearly shown in Figures 6 and 7, the scales L, M, N, O, P and the scale frame 77 may be linear. In this case as with curved scales accurate registration is ensured when corresponding points on the several scales are equally distant from the dial axis and ends of the respective scales are unequally distant from this axis.

Figure 7:
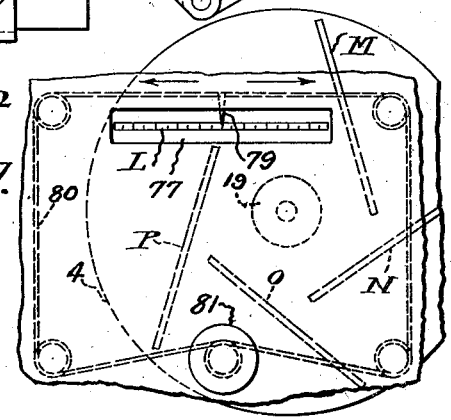
Figure 7 is a front elevation of a tuning indicator including the dial of Figure 6.

It is, of course, necessary that the pointer and pointer-moving mechanism be of a type suitable for use with the linear scales. In Figure 7 a traveling pointer 79 fixed to a taut cord or chain 80 is adapted to be moved across the scale upon movement of pulley knob 81 which may conveniently be geared to be driven by the main tuning shaft. The dial 4 is moved in discrete steps by means of a hub 19 which is adapted to be also connected to a wave change switch mechanism, not shown.

In the interests of clearness and completeness appropriate tuning and dial moving devices have been described; it is to be understood, however, that the invention is not to be limited to the particular mechanisms illustrated.

Although several embodiments of the multi-scale dial of the present invention have been shown and described, it will be apparent to those skilled in the art that various modifications thereof can be made without departing from the spirit of the invention or the scope of the appended claims.

I claim as my invention:

1. An indicator comprising a disc-like dial having an axis extending at right angles thereto, a plurality of scales so arranged on said dial that corresponding points on the several scales are equally distant from said axis and the opposite ends of the respective scales are unequally distant from said axis, a pointer adapted to cooperate with respective of said scales and means for relatively moving said dial about said axis to selectively bring said scales and pointer into cooperative relation.

2. An indicator in accordance with claim 1 characterized in that said scales are substantially arcuate.

3. An indicator in accordance with claim 1 characterized in that said scales are substantially semi-circular.

4. An indicator in accordance with claim 1 characterized in that said scales are substantially linear.

5. An indicator in accordance with claim 1 characterized in that said dial is provided with more than two scales of equal dimensions.

6. An indicator comprising a disc-like dial, a plurality of arcuate scales eccentrically arranged thereon, a frame adapted to register with respective of said scales and means for rotating said dial about a central axis to selectively frame said scales.

7. An indicator in accordance with claim 6 characterized in that said frame and each of said scales extend 180 degrees.

8. An indicator comprising a dial in the form of a disc supported for rotation about an axis which extends at right angles thereto, said disc having a plurality of scales eccentrically arranged thereon and symmetrically arranged around said axis.

9. An indicator comprising a dial in the form of a disc supported for rotation about an axis which extends at right angles thereto, said disc having more than two substantially semi-circular scales arranged thereon, the radii of said scales being substantially equal.

10. An indicator dial comprising a circular disc having more than two substantially arcuate scales arranged thereon, said scales spanning a distance at least as great as the radius of said disc.

11. An indicator dial comprising a circular disc having a plurality of arcuate scales eccentrically arranged thereon, the radial centers of said scales falling on a circle whose center coincides with the center of said disc.

12. An indicator comprising a flat plate having more than two scales thereon and supported for rotation about an axis normal to the plane thereof, the mid-points of all of said scales being equally distant from said axis and the opposite ends of the respective scales being unequally distant from said axis.

13. The combination, in multi-range radio apparatus having means for changing the frequency range of said apparatus, of a dial in the form of a disc supported for rotation about an axis normal to the plane thereof and having a plurality of scales eccentrically arranged thereon, each of said scales representing one frequency range of said radio apparatus, an escutcheon having an aperture through which one of said scales may be viewed, and means for selectively registering said scales with said aperture.

14. The combination, in multi-range radio apparatus having means for changing the frequency range of said apparatus, of an escutcheon having a substantially semi-circular aperture therein, a dial in the form of a disc supported for rotation about an axis normal to the plane thereof and having a plurality of substantially semi-circular scales eccentrically arranged thereon, each of said scales representing one frequency range of said radio apparatus, and means for selectively framing said scales in said escutcheon aperture.

15. In a tuning indicator, a tuning indicator axis, an escutcheon having an arcuate aperture concentrically disposed about said axis, a second axis offset from said first mentioned axis, a dial disposed for rotation about said second axis, a plurality of arcuate scales on said dial, the radial centers about which the separate scales are circumscribed being offset from said second axis a distance required to ensure registration of said scales with respect to said aperture upon relative movement of said dial and escutcheon.

16. The invention as set forth in claim 15 and wherein the radial center of each of said separate scales falls on the circumference of a circle whose radius is substantially equal to the distance from said tuning indicator axis to the axis about which said dial is disposed.

17. The invention as set forth in claim 15 and wherein each of said scales and said escutcheon aperture extend through an arc of substantially 180 degrees.

18. In a tuning indicator, a tuning control shaft, an escutcheon in which said shaft is centered, said escutcheon having a semi-circular aperture therein, a second shaft offset from said tuning shaft, a dial mounted on said second shaft, said dial having a plurality of substantially semi-circular scales eccentrically arranged thereon, the radial center of each of said semi-circular scales falling on the circumference of a circle whose radius is substantially equal to the distance from said tuning control shaft to said second shaft, and means requiring relative rotary movement between said escutcheon and said dial for selectively framing said scales in said escutcheon aperture.

19. In a tuning indicator, a tuning indicator shaft, an escutcheon in which said shaft is centered, said escutcheon having a substantially semi-circular aperture therein, a second shaft offset from said first mentioned shaft, a dial rotatably mounted on said second shaft, said dial having a plurality of substantially semi-circular scales eccentrically arranged thereon, the radial center of each of said scales falling on the circumference of a circle whose radius is substantially equal to the distance between said shafts, and means for revolving said dial to selectively frame said scales in said escutcheon aperture.

SHELDON C. HAYWARD.